(12) United States Patent
Murphy

(10) Patent No.: US 6,316,912 B1
(45) Date of Patent: Nov. 13, 2001

(54) POWER GENERATING DEVICE HAVING A FORM FACTOR SUITABLE FOR INSERTION INTO A PLAYER DEVICE

(75) Inventor: John A. Murphy, Beacon, NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/627,189

(22) Filed: Jul. 27, 2000

(51) Int. Cl.[7] .................................................. H01M 10/46
(52) U.S. Cl. ................................................................ 320/114
(58) Field of Search ................................... 370/101, 104, 370/114, 115; 235/492, 493

(56) References Cited

U.S. PATENT DOCUMENTS

| | | | |
|---|---|---|---|
| 5,055,947 | 10/1991 | Satoh | 360/62 |
| 5,159,182 | * 10/1992 | Eisele . | |
| 5,274,584 | 12/1993 | Hendertson et al. | 365/64 |
| 6,039,260 | 3/2000 | Eisele | 235/492 |

FOREIGN PATENT DOCUMENTS

| | | | |
|---|---|---|---|
| WO0013181 | 3/2000 | (WO) | G11B/23/00 |
| WO0016335 | 3/2000 | (WO) | G11B/23/04 |

* cited by examiner

*Primary Examiner*—Edward H. Tso
(74) *Attorney, Agent, or Firm*—Gregory L. Thorne

(57) ABSTRACT

A cassette form factor device containing a drive wheel and a generator. The drive wheel is positioned to be in frictional contact with a pinch-roller of a cassette-playing device when the cassette form factor device is inserted into a play position on the cassette-playing device. The generator is driven by the drive wheel and generates electrical power to energize one or both of the cassette form-factor device and an external device when the cassette-playing device drives the drive wheel. The cassette form factor device may contain an MP3 player having a read/write head. The read/write head is positioned so that when the cassette form factor device is inserted into the play position on the cassette-playing device, the read/write head may provide content from the MP3 player to the cassette-playing device. The cassette form factor device may contain a rechargeable battery operatively that is connected to the generator so that the generator may recharge the rechargeable battery. The cassette form factor device may be an audiocassette form factor device.

5 Claims, 1 Drawing Sheet

POWER GENERATING DEVICE HAVING A FORM FACTOR SUITABLE FOR INSERTION INTO A PLAYER DEVICE

FIELD OF THE INVENTION

This invention generally relates to a device for generating power for energizing or re-energizing an electronic device. Specifically, the present invention pertains to a device for generating power that is driven to generate the power during the course of normal operation of a second device.

BACKGROUND OF THE INVENTION

Audio and videocassette tape players/recorders are known. In operation of these devices, a suitable cassette, such as an audio or videocassette, containing audio or videotape, respectively, is inserted into the tape players device. FIG. 1 shows an illustrative example of a portion of an audiocassette tape player device and an audiocassette tape. From the audiocassette player, spindles S1, S2 are shown. These spindles are utilized to assist in spooling audiocassette tape from tape reels T1, T2. In operation, one of the tape reels T1, T2 operates as a supply reel, supplying audio tape, and the other operates as a take-up reel, to ensure that the audio tape is properly spooled on take up. The path of the audio tape is typically guided by two guide rollers (not shown), contained in the audiocassette, to pass over a position 130 wherein the read/write head of the audiocassette can contact the audiocassette. The audio cassette player has a capstan 120, that passes through a hole contained in audiocassette, and a pinch roller 110. During play, record, fast-forward, etc, of the audio tape, the capstan 120 and pinch roller 110 come together with the audio tape positioned there between, for the purposes of pulling the audio tape from the supply reel so that the tape-up reel can spool it. A videocassette player operates in a similar fashion.

Further, it is known that an audio interface, having a similar form factor of an audiocassette, may be utilized so that a portable compact disc (CD) player may be played through a fixed stereo system, such as a car stereo, having an audio cassette player. In operation, the audio interface has an extension cord that plugs into line level outputs on the CD player. The audio interface is intended to be inserted into the cassette player of the car stereo and has a controllable magnetic source that roughly corresponds to the position 130 discussed above. Thereafter, when the CD player plays a CD, the CD content controls the magnetic source to produce a corresponding magnetic field. The read/write head of the audiocassette player reads this magnetic field and thereby, the audio cassette player reproduces the CD content over the car speakers.

Portable solid state players are also known, such as those that play moving picture expert group 3 (MP3) compliant audio content as well as content stored in other formats. These solid state players store content in a solid state memory in a compressed form. During a play operation, the content is converted back to a rough equivalent of the original uncompressed content and is typically reproduced via a speaker or headphone. Solid state players are becoming more and more popular since they are sturdy, resist skipping of the content due to impact during the play operation, and are very portable. A particular version of the solid state player is constructed having an audiocassette form factor so that content stored on the solid state player may be played via a fixed stereo system similar to as discussed for the portable CD player.

All of these portable players share a common limitation in that they all are powered by a local power source. For portability, these portables typically contain a battery power source. The battery power source may be either of rechargeable or non-rechargeable batteries. Problematically, either of these battery sources have a fixed relatively short time interval in which the portables may be played and then the batteries must be changed or recharged. To extend operation of the portables, they may be plugged into a fixed power supply, for instance via a car cigarette lighter socket, an alternating current power source, etc, for playing and charging operations but this requires additional charging apparatus.

Accordingly, it is an object of the present invention to overcome the disadvantages of the prior art.

SUMMARY OF THE INVENTION

The present invention is a cassette form factor device that contains a drive wheel and a generator. The drive wheel is positioned to be in frictional contact with a pinch-roller of a cassette-playing device when the cassette form factor device is inserted into a play position on the cassette-playing device. The generator is driven by the drive wheel and generates electrical power to energize one or both of the cassette form-factor device and an external device when the cassette-playing device drives the drive wheel.

In one embodiment, the cassette form factor device may contain an MP3 player having a read/write head. The read/write head is positioned so that when the cassette form factor device is inserted into the play position on the cassette-playing device, the read/write head may provide content from the MP3 player to the cassette-playing device. The cassette form factor device may contain a rechargeable battery that is connected to the generator so that the generator may recharge the rechargeable battery. In one embodiment, the cassette form factor device is an audiocassette form factor device.

BRIEF DESCRIPTION OF THE DRAWINGS

The following are descriptions of embodiments of the present invention that when taken in conjunction with the following drawings will demonstrate the above noted features and advantages, as well as further ones. It should be expressly understood that the drawings are included for illustrative purposes and do not represent the scope of the present invention. The invention is best understood in conjunction with the accompanying drawing in which.

DETAILED DESCRIPTION OF THE INVENTION

In the discussion to follow, certain terms will be illustratively discussed in regard to specific embodiments or systems to facilitate the discussion. However, as would be readily apparent to a person of ordinary in the art, these terms should be understood to encompass other similar applications and embodiments wherein the present invention could be readily applied. For example, the term audiocassette form factor should be understood herein to describe a device having a suitable shape and size as an audiocassette to enable use of the device in place of an audiocassette. As would be readily apparent to a person of ordinary skill in the art, other form factor devices may also be formed to operate with other devices without deviating from the spirit and scope of the present invention. Accordingly, although an audiocassette form factor device is illustratively described herein, this term should be understood to encompass other form factor devices that may be utilized to operate in accordance with the present invention. For example, a device in accordance with the present invention may have a videocassette recorder (VCR) cassette form factor and thereby, operate in accordance with the present invention in conjunction with a VCR.

Figure 1:
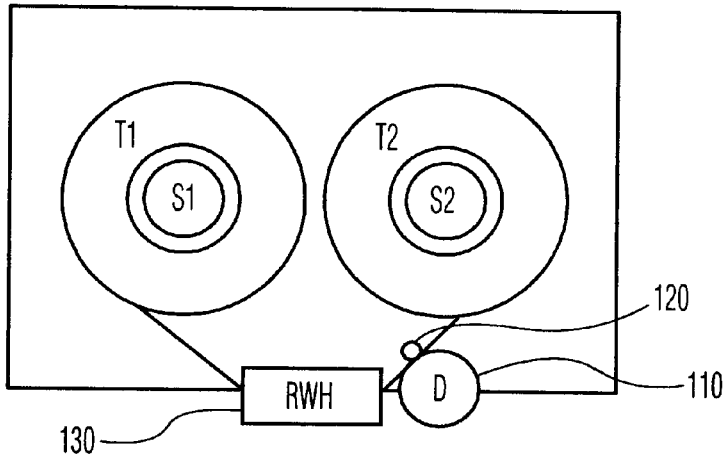
FIG. 1 shows a block diagram of a portion of a prior art audiocassette tape and player.
Figure 2:
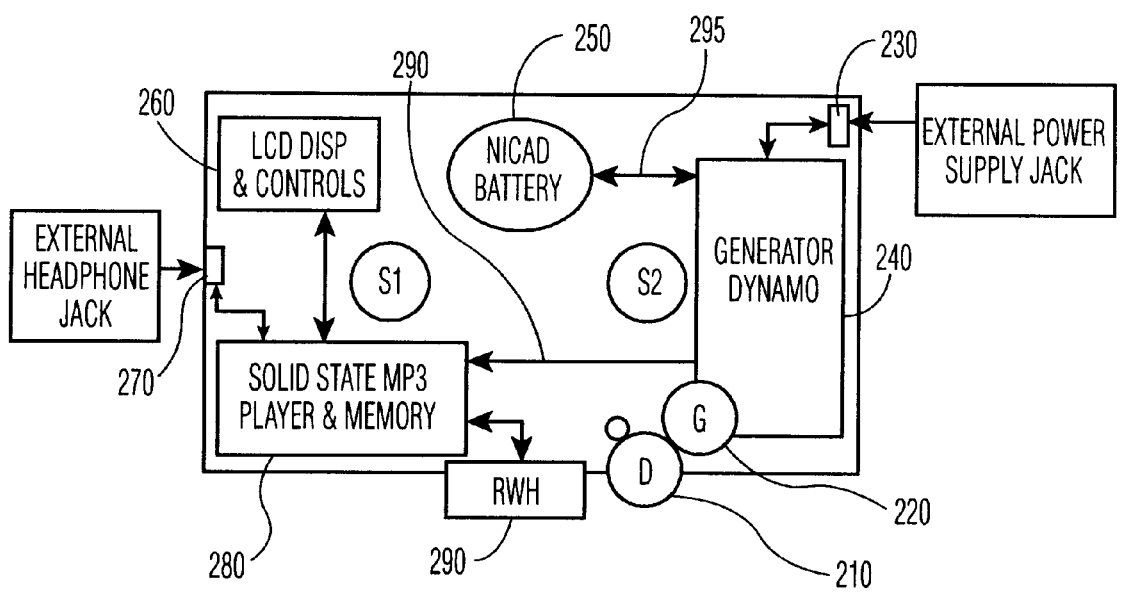
FIG. 2 shows an MP3 player having an audio cassette tape form factor in accordance with an embodiment of the present invention.

FIG. 2 shows a device 200 having an audiocassette tape form factor in accordance with an embodiment of the present invention. The device 200 contains a solid-state MP3 player and memory 280. The operation of an MP3 player and memory are well known in the art and will not be discussed further herein except as is necessary to describe the operation of the device 200 in accordance with the present invention.

The MP3 player and memory 280 are operatively coupled to a controllable magnetic field generator 290. The magnetic field generator 290 is positioned to correspond to a read/write head of an audiocassette player (not shown). The player and memory 280 are also coupled to a headphone jack/input 270 and a liquid crystal display (LCD) and controls 260. Further, the device 200 may have an internal power source 250, such as a nickel cadmium battery, that in a portable mode (e.g., external from an audiocassette player) may be utilized for powering the device 200. As would be readily apparent to a person of ordinary skill in the art, other suitable internal powers sources may also be utilized.

Inventively, the device 200 also contains a generator/dynamo 240 that is coupled to the LCD and controls 260, the MP3 player and memory 290, and the read/write head 290 via a connection 290. The generator/dynamo 240 is also coupled to the battery 250 via a connection 295. As would be readily apparent to a person of ordinary skill in the art, the generator/dynamo also may contain other components for regulating the voltage and current provided to the battery 250 and the components and controls of the device 200. The generator/dynamo 240 may be utilized for powering the device 200 and for recharging the battery 250 in accordance with an embodiment of the present invention. The battery 250 may be utilized for energizing the device 200 when the device 200 is not inserted into the audiocassette player, also known as a stand-alone mode of the device 200.

The generator/dynamo 240 is coupled to a drive wheel 220. The drive wheel 220 is positioned such that it is in frictional contact with a pinch-roller 210 of the audiocassette player when the device 200 is inserted into the audiocassette player and a play, fast forward, etc., operation is initiated. In this way, the pinch roller 210, via the drive wheel 220, is utilized for driving the generator/dynamo 240. In accordance with the present invention, the generator/dynamo 240 produces power for operating the device 200 and for charging the battery 250.

In the embodiment shown, the drive wheel 220 is a direct drive wheel of the generator/dynamo 240. However, as would be readily apparent to a person of ordinary skill in the art, the drive wheel 220 may be coupled to the generator/dynamo via a belt drive system, a gear assembly, etc., for operation in accordance with other embodiments of the present invention.

The device 200 may also be utilized for powering and charging other devices, such as a portable CD player, a portable cassette player, etc., via an external power supply jack 230 which is operatively coupled to the generator/dynamo 240 as shown. In other embodiments, the device 200 may not contain MP3 components and controls and may operate as a power supply for an external device as discussed above. In some of these embodiments, the device 200 may also be utilized for playing audio of an external device through an audio cassette player via the read/write head 290. In this operation, the headphone jack/input 270 operates as a line-input from the external device for providing audio content from the external device to the cassette player via the read/write head 290. Clearly, the headphone jack and input described above may in fact be a separate output (headphone jack) and input, although this is not shown.

Finally, the above-discussion is intended to be merely illustrative of the invention. Numerous alternative embodiments may be devised by those having ordinary skill in the art without departing from the spirit and scope of the following claims.

The claimed invention is:

1. A cassette form factor device comprising:
   a drive device configured to be driven by a cassette playing device;
   a generator operatively coupled to the drive device and configured for generating electrical power to energize at least one of the cassette form-factor device and an external device when the drive device is driven by the cassette playing device;
   a control device operatively coupled to the generator; and
   a read/write head coupled to the control device and configured together with the control device for providing content to the cassette player device.

2. The cassette form factor device of claim 1, wherein the cassette form factor device is an audiocassette form factor device and the control device comprises a memory configured to store content and provide the content to the cassette player through the read/write head.

3. The cassette form factor device of claim 2, wherein the cassette form factor device is an audiocassette form factor device.

4. The cassette form factor device of claim 3, wherein the cassette form factor device is an MPEG audio player device.

5. The cassette form factor device of claim 1, comprising a rechargeable battery operatively coupled to the control device and to the generator wherein the generator is configured to recharge the rechargeable battery and the rechargeable battery is configured to energize the cassette form factor device in a stand-alone mode.

* * * * *